Dec. 5, 1933.    J. P. ALDRICH    1,937,501
MACHINE FOR MAKING AND FILLING PACKAGES
Filed June 1, 1931    5 Sheets-Sheet 1

Inventor
John P. Aldrich
By
Owen + Owen
Attorneys

Patented Dec. 5, 1933

1,937,501

UNITED STATES PATENT OFFICE 1,937,501

MACHINE FOR MAKING AND FILLING PACKAGES

John P. Aldrich, Toledo, Ohio

Application June 1, 1931. Serial No. 541,183

21 Claims. (Cl. 93—3)

This invention relates to bag making and filling machines, but more particularly of the type in which an elongate tube is formed of flexible sheet material, the outer end of which is closed and a charge of filling material is inserted into the tube whereupon a closure is formed in the tube above the charge, thereby providing a filled package.

An object of the invention is to produce a satisfactory mechanism for concomitantly forming two closures in a bag tube, one of which provides the upper end of one package and the other provides the bottom end of the next succeeding package, such mechanism being operable speedily and efficiently, and adapted to work satisfactorily in production. To the above end, this invention is an improvement on the mechanism shown and described in my copending application Serial No. 527,715, filed April 4, 1931, and the specific features of construction and operation appear to lend themselves more satisfactorily for production purposes.

Another object is to produce a simple and efficient machine for making and filling bags having the new and improved features of construction, arrangement and operation hereinafter described.

For purposes of illustration embodiments of the invention are shown on the accompanying drawings, in which.

The illustrated embodiment of the invention comprises a machine for making and filling bags, and in many respects is similar to the machine shown and described in my above mentioned copending application to which reference is hereby made. The machine forming the subject matter of the above earlier application operated successfully in practice, but some parts were not so designed as to withstand continued operation over an extended period of time. The machine hereinafter described constitutes an improvement over the previous machine because it is more positive in action and is constructed more sturdily so that it can operate without as careful attention, and liability of shut down due to repairs is materially reduced.

Figure 12:
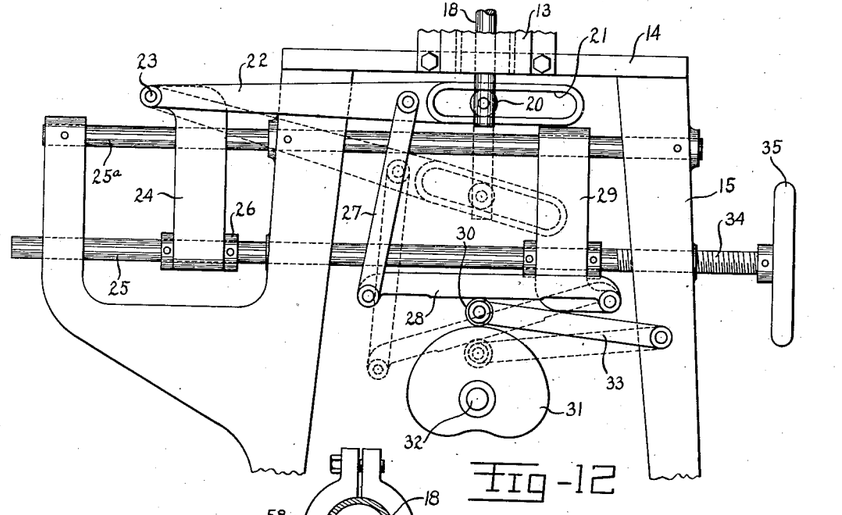
Figure 12 is a side elevation of the mechanism for adjusting the stroke of the tube mandrel.

Referring to the drawings, the material which is preweighed or of predetermined bulk is dumped into a hopper 10 having a depending tube 11 which is clamped to a lateral arm 12, the opposite end of which is fixed to a vertical post 13. The lower end of the post 13 is secured to a table 14 suitably mounted on a framework or legs 15 (Fig. 12). The hopper tube 11 extends inside a mandrel 16 to which is secured a pair of lateral arms 17, the opposite ends of which are connected to a vertical post 18 disposed within the tubular post 13. Vertical reciprocatory movement is imparted to the mandrel 16 through the post 18, an elongate slot 19 formed in the inner sides of the outer post 13 providing clearance for the lateral rods 17.

For reciprocating the post 18, a roller 20 is mounted on the lower end thereof, and extends into an elongate slot 21 formed in the inner end of a lever 22. The outer end of the lever 22 is pivoted at 23 to a bracket 24, which is mounted on vertically spaced horizontal shafts 25 and 25ª having bearings in the frame 15 and being held against endwise movement by collars 26. Pivoted to the lever 22 adjacent the slot 21 is a link 27, to the lower end of which is pivoted the outer end of an arm 28. The arm 28 is pivoted at its inner end to a bracket 29 which is also carried by the shafts 25 and 25ª. Disposed beneath the arm 28, which is normally in a substantially horizontal position, is a roller assembly 30 having two rollers, one of which engages the underside of the arm 28 and the other engages the peripheral surface of a cam 31 carried by a shaft 32. The roller assembly 30 is mounted on the end of one arm 33 which has its outer end pivoted to the frame 15.

It will be observed that the cam 31 is so constructed that vertical reciprocatory movements are intermittently imparted to the mandrel 16. As will hereinafter appear the purpose of moving the mandrel vertically is to advance the elongate bag tube, the length of the stroke of the mandrel determining the length of the package discharged from the machine. In order to vary the size of the package the stroke of the mandrel may be varied so that a longer or shorter package may be produced. For this purpose the outer end of the shaft 25 is screw threaded at 34, which is in threaded engagement with the frame 15. A hand wheel on the outer end of the shaft 25 enables the shaft to be moved longitudinally. It is manifest from the disclosure in Fig. 12 that by moving the shaft 25 to the left of the figure a greater movement or stroke is imparted to the mandrel 16, and adjustment of this shaft to the right of the figure will decrease the stroke of the mandrel.

The present machine is particularly adapted for making bags from sheet cellophane, although other flexible sheet materials of similar nature may be used to advantage. A roll of this material of suitable width is mounted on a roll 36 supported in any suitable manner, and the sheet material S from the source of supply passes over guide plates 37 having downwardly inclined guiding surfaces, one plate being arranged on opposite sides of the mandrel 16. From the guide plates 37 the material is drawn downwardly about the mandrel and into tubular form and is held in position by tube-forming plates 38 embracing the mandrel 16 and disposed on opposite sides thereof. The plates 38 are slidably mounted on the vertically spaced guide rods 39 carried by a bracket 40 secured to the tubular post 13. Coil springs 41 yieldingly retain the tube forming plates 38 in operative position.

Figures 1, 10, 11:
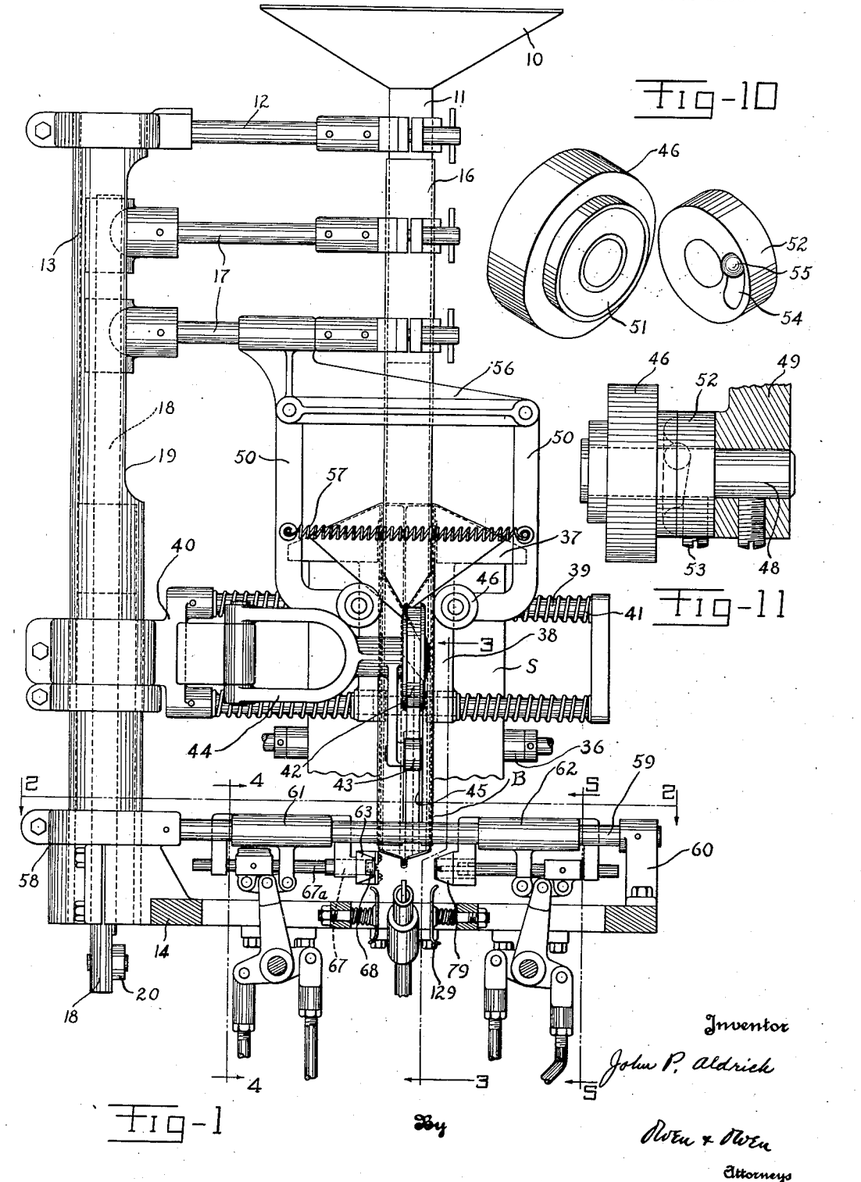
Figure 1 is a front elevation partly in section of a machine for making and filling bags, parts of the drive being broken away.
Figure 10 is a perspective view of parts of one of the rollers which engage the sheet material on the mandrel.
Figure 11 is an assembly view of the roller shown in Fig. 10.

As shown in Fig. 1, the sheet material S is overlapped in the front of the mandrel and the overlapping portions are sealed by adhesively coated tape mounted on a supply reel 42 and pressed in place by a roller 43. The reel 42 and roller 43 are carried by a yoke arm 44 pivotally connected to the bracket 40 so that the tape applying apparatus may be swung outwardly away from the mandrel. It will be understood that an elongate slot 45 is formed in the lower portion of the tube forming plates 38 to receive the tape and pressure roll 43.

When the machine is ready to operate for the first time the lower end of the elongate bag tube B formed in the above described manner is closed at its lower end in any suitable manner. Upon downward movement of the mandrel 16 the lower end thereof engages the closed end of the bag tube B and moves the same downwardly, and in so doing additional sheet material S is drawn from the roll 36 and automatically drawn into tubular form, the overlapping edge of the sheet being sealed by the tape applied as above described.

Figures 3, 4, 5, 6, 7, 8, 9:
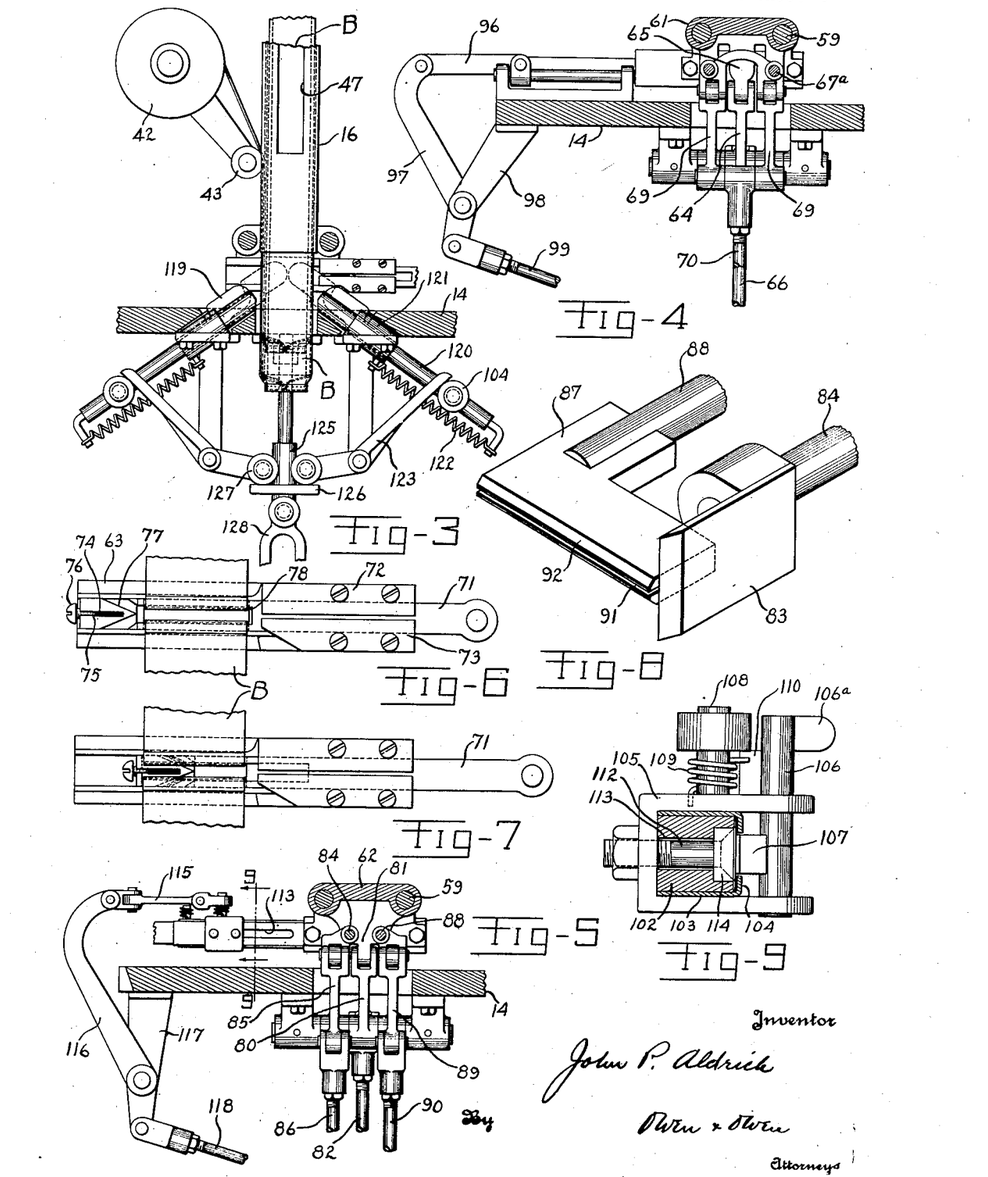
Figure 3 is a vertical sectional view on the line 3—3 of Fig. 1.
Figure 4 is a vertical sectional view on the line 4—4 of Fig. 1.
Figure 5 is a vertical sectional view on the line 5—5 of Fig. 1.
Figure 6 is a side elevation of the tape cutter and folder and associated clamp.
Figure 7 is a view similar to Fig. 6 showing the tape cutter and folder operating to fold the tape.
Figure 8 is a perspective view of the initial tape folder and transverse tape cutter.
Figure 9 is an enlarged sectional view on the line 9—9 of Fig. 5.

Under some conditions it may be desirable to relieve the strain on the end of the tube B when feeding or advancing movement is imparted to the mandrel 16, thereby to militate against tearing out of the tube at the lower end due to the pressure and force of the downwardly moving mandrel. For this purpose a pair of rollers 46 extend through elongate slots 47 formed in opposite sides of the tube-forming plate 38 (Fig. 3). The rollers 46 are mounted on stub shafts 48 secured to pivotally mounted arms 50.

Each roller 46 is provided with an annular track 51 at one side thereof against which abuts a collar 52 which is fixed to the shaft 48 by a set screw 53. Formed in the inner face of the collar 52 is a groove or recess 54 to receive a ball 55. The inner wall of the recess 54 is inclined so that the roller 46 is free to move in one direction, there being sufficient clearance at one end of the recess 54 to permit the ball 55 to rotate freely, but movement of the roller 46 in the opposite direction is prevented since the opposite end of the recess 54 is of such dimension that the ball crowds or is jammed tightly in place, thereby preventing rotation of the roller 46 in that direction. This arrangement enables the rollers 46 to move freely in a counter clockwise direction or when the mandrel 16 is moving upwardly, but prevent movement or rotation of the rollers 46 when the mandrel is moving downwardly. Thus the rollers 46 frictionally engage the bag tube B when feeding movement is imparted to the mandrel 16 and assist in moving the bag tube downwardly and drawing additional sheet material into bag tube formation.

As shown, the upper ends of the arms 50 are pivoted to a bracket 56 mounted on the lower arm 17. A coil spring 57 connects the arms 50 and urges them toward each other in order to increase the frictional engagement between the rollers 46 and the sides of the bag tube B.

After the bag tube B has been advanced a sufficient distance by the mandrel 16 the latter returns to its normal raised position, leaving a length of the bag tube depending below the lower end of the mandrel. A charge of filling material may then be inserted into the hopper 10 from which it drops through the tube 11, mandrel 16, and into the bag tube B. As will hereinafter appear either substantially at the time of inserting the filling material or directly thereafter, two closures are concomitantly formed in the bag tube B forming a closure for the top of the depending bag tube portion into which a charge of filling material has been inserted, and a bottom closure for the next succeeding bag.

Extending laterally from a clamp 58 on the tubular post 13 is a pair of parallel rods 59, the opposite ends of which are mounted on a supporting bracket 60. Slidable on the rods 59 are the closure forming mechanisms 61 and 62, which are intermittently movable toward each other to clamp together the walls of the bag tube B, sever the bag tube and binding tape, and bend the tape segments about the ends of the severed bag tube sections.

Movable with and rigidly secured to the body portion of the closure mechanism 61 is a clamping head or jaw 63, the upper and lower surfaces of which incline outwardly from the vertical face of the head in order to conform to the shape of the finished package. The clamping mechanism 61 is reciprocated on the rods 59 by a bell crank 64, which is pivoted to a depending lug 65. A rod 66 depends from the bell crank 64, and may be actuated by a suitable cam roller (not shown).

Carried by the closure mechanism 61, but movable relatively thereto, is a punch 67 from which extends a pair of actuating rods 67ª, the head of which is slidable within the clamping head 63 and is provided with a recess or cavity 68 at its outer end. The actuating rods 67ª are driven by a pair of bell cranks 69 to which is connected a depending operating rod 70 driven from a suitable cam roller (not shown). Formed on the face of the clamping head 63 is a guideway in which reciprocates a slide or shuttle 71. To assist in guiding the reciprocatory movement of the shuttle 71, an extension 72 projects laterally from the clamping head 63, to which are secured gibs 73 for cooperating in guiding the movements of the shuttle.

It will be observed that the face of the clamping head 63 is somewhat longer than the width of the bag tube B. Attached to the forward end of the shuttle 71 is a knife blade 74, which is disposed within a slot 75 formed in the end portion of the shuttle. A set screw 76 extends into the slot 75 and bears against the knife blade for holding the latter in place. In rear of the blade 74 is a pair of oppositely extending cam surfaces 77, which diverge outwardly toward the forward end of the shuttle. In rear of the cam surfaces 77 is an elongate opening 78, the length of which is slightly in excess of the width of the bag tube B, the purpose of which will hereinafter appear.

The shuttle 71 is slidably mounted for lateral movements at its inner end on a rod 93, and blocks 94 on opposite ends of the rod 93 slidably engage guide rods 95 secured to the table 14. Pivoted to the rod 93 is an arm 96, to the outer end of which is pivoted a lever 97. The lever 97 is pivoted adjacent its lower end to a bracket 98 secured to the underside of the table 14, and a rod 99 is pivoted to the lower end of the lever 97, a suitable cam roller (not shown) being provided for actuating the rod 99.

The closure forming unit 62 is provided with a clamping head or jaw 79, which has upper and lower outwardly inclined surfaces similar to those above described in connection with the head 63. The jaw 79 is integral with the body of the unit 62, and for reciprocating the unit, a bell crank 80 is pivoted to a bracket 81 depending from the body portion of the unit, and a rod 82 connected to the opposite end of the bell crank 80 is adapted to be driven by a suitable cam roller (not shown).

Carried by the unit 62, but movable relatively thereto, is a tape cutter 83 for cutting a length of tape from the supply, as will hereinafter be described. The cutter 83 is carried by a rod 84 reciprocable in the body portion of the unit 62, and is driven by a bell crank 85 to which is connected an actuating rod 86 driven by a suitable cam roller (not shown). A folding punch 87 is carried by a rod 88 reciprocable in the body portion of the unit 62, and a bell crank 89, connected to actuate the rod 88, is actuated by a rod 90 driven from a suitable cam roller (not shown).

The face of the punch 87 is provided with an elongate groove 91, in which slides the knife blade 74 of the shuttle 71 when the clamping jaws 63 and 79 are brought together. On the front face of the punch 87 on opposite sides of the groove 91 are rearwardly and outwardly inclined shoulders 92 for initially bending the closing tape, as will hereinafter appear.

Figure 2:
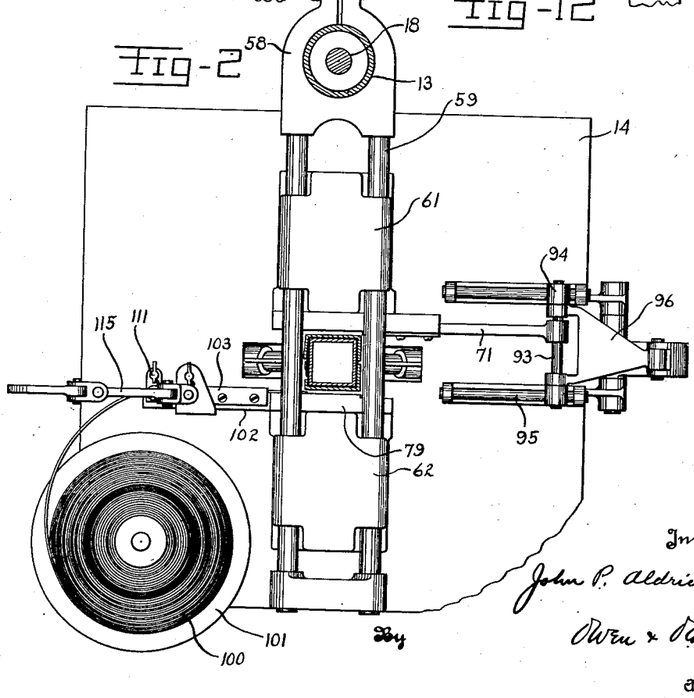
Figure 2 is a transverse sectional view on the line 2—2 of Fig. 1.

As above mentioned, the bag tube is severed and a sealing tape is applied to the ends of the bag tube sections for closing the ends thereof. The tape may be of any suitable sheet material, but preferably is of relatively thin bendable sheet material, such as plated zinc, brass, or tin plated sheet steel. As shown in Fig. 2, a roll of tape 100 of the desired material is mounted on a turntable or disc 101. The tape is guided from the disc 101 to a tape feeding unit, which is carried by the closure forming unit 62, the tape being fed along the face of the clamping jaw 79.

As shown, the clamping jaw 79 is provided with a lateral extension 102, on which are mounted plates 103 having inturned ends 104 providing a guide for the tape. Embracing the guide plates 103 is a substantially U-shaped frame 105, on which is mounted a vertical rotatable post 106 having a handle 106ª. Projecting from the post 106 is a pawl or dog 107, which is engageable with the tape in the space between the inturned ends 104 of the guide plates 103. Mounted on the upper portion of the supporting member 105 is a post 108 on which is disposed a helical spring 109 which has one end secured to the frame 105, and the opposite end fixed to a plate 110 projecting from the post 106. The spring serves to retain the post 106 in such position that the dog 107 is in feeding or frictional engagement with the tape when the supporting member 105 moves to the right of Fig. 2 to feed the tape along the face of the clamping jaw 79 the desired distance to extend across the bag tube. When the supporting member 105 moves in the opposite direction it will be apparent that the dog 107 may ride freely over the tape so as not to withdraw the tape from the desired position.

In order to insure that the tape remains in the desired position on the face of the clamping jaw 79 when the feeding unit is retracting, an arrangement similar to that shown on Fig. 9, but stationarily mounted on the jaw extension 102, assists in preventing retrograde movement of the tape, such device being generally designated by the numeral 111.

For guiding the reciprocating movements of the frame 105, a rod 112 extends through an elongated slot 113 in the jaw extension 102, and a head 114 on the rod 112 slides in a guideway provided in the extension 102. The frame 105 and the parts carried thereby are reciprocated by an arm 115, which has universal connection with the supporting member 105 at one end, and with a bell crank 116 in the opposite end, the latter being mounted on a bracket 117 secured to the underside of the table 14 and actuated by a rod 118 driven from a suitable cam roller (not shown).

As shown in Fig. 3, spring folding fingers 119 are adapted to fold in opposite sides of the bag tube in the region of the closure in order to enable bag to be closed neatly. One finger 119 is arranged on opposite sides of the path of the bag tube B, and is adapted to extend upwardly and inwardly toward the bag tube. Each finger 119 is mounted on a rod 120, which reciprocates in a bearing sleeve 121 carried by the table 14. A spring 122 connected to the bearing sleeve 121 and the outer end of the rod 120 urges the finger to folding position. The fingers are normally held in inoperative position by bell cranks 123 engaging rollers 124 on the rod 120. The bell cranks 123 are actuated by a vertically movable sleeve 125 carrying a plate 126 engaging rollers 127 on the inner end of the bell cranks 123. The sleeve 125 is driven through a strap 128 by a suitable cam roller (not shown). As will be observed in Fig. 3, the fingers 119 move upwardly and inwardly, and in so doing lift the depending portion of the bag tube. For yieldingly holding the lower end of the bag tube in the desired position when the clamping jaws are separated, and after side folds have been made in the tube, spring pressed plates 129 engage opposite sides of the bag tube.

Figures 13, 14, 15, 16, 17, 18:
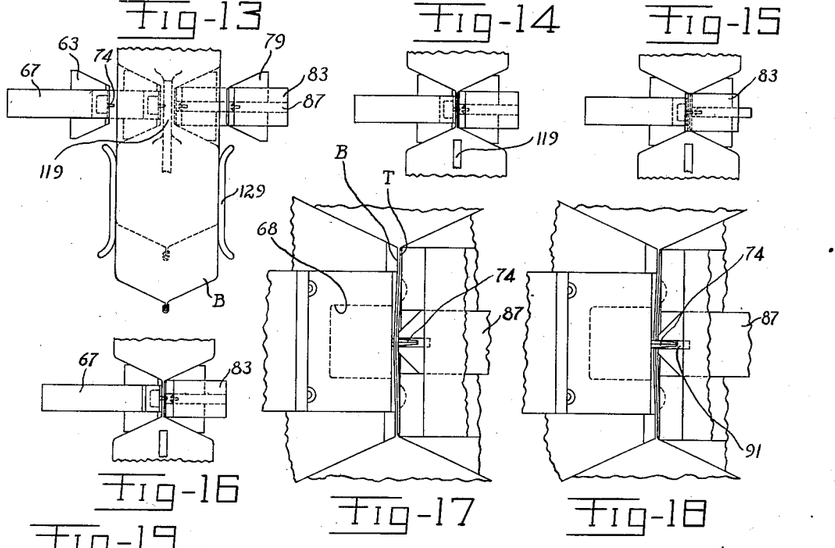
Figures 13 to 22 are diagrammatic views showing the steps in the closure-forming operation.

In the operation, as diagrammatically shown in Figs. 13 to 22, the folding fingers 119 first operate to fold inwardly opposite sides of the bag tube B, and the clamping jaws 63 and 79 are moved together, as shown by the dotted lines in Fig. 13. As the fingers 119 retract the jaws 63 and 79 securely press together the walls of the bag tube. Prior to this time, however, tape 100 has been fed along the face of the jaw 79. As shown in Fig. 15, the tape cutter 83 is moved forwardly to sever a strip of tape from the remainder. As shown in Fig. 16, the punch 67 retracts as well as the tape cutter 83. In the next step the bending punch 87 moves forward slightly toward the recess or cavity 68 in the punch 67, and holds the tape T and adjacent bag walls taut. Thereupon the shuttle or slide 71 moves forward, and the knife blade 74 severs the tape and bag walls across the bag tube along a line of severance midway between the upper and lower edges of the tape.

Figures 19, 20, 22:
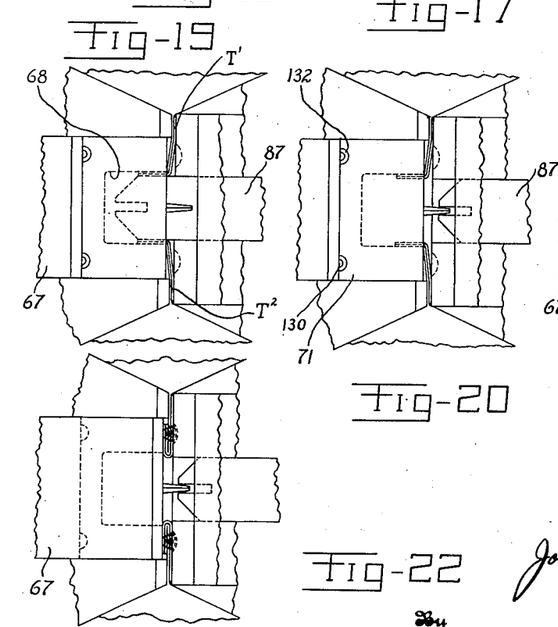
Figure 21:
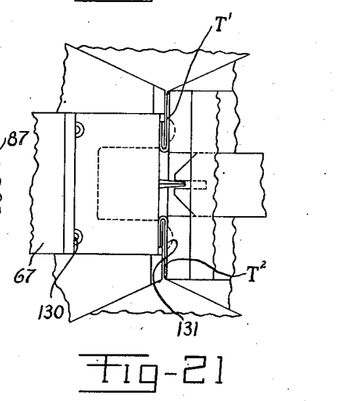

Fig. 18 shows the knife blade 74 after it has severed the tape and the walls of the bag tube. In the next step the folding plunger 87 advances into the cavity 68 through the elongate opening 78 in the shuttle 71, and thereby bends portions of the tape segments T' and T² at substantially right angles (Fig. 19). At the same time the portions of the walls of the bag tube in engagement with the tape segments are likewise folded. Thereafter (Fig. 17), the folding plunger 87 retracts, and after it is moved out of the way, the shuttle or slide 71 moves in the opposite direction, whereupon the oppositely extending cam surfaces 77 engage respectively the outwardly bent portions of the tape segments T' and T², and progressively bend them together with the engaged portions of the bag tube upon themselves, as indicated in Fig. 21, thereby obtaining concomitantly a pair of closures for the severed bag tube sections.

The final operation consists in advancing the punch 67 forwardly into engagement with the bent portions of the tape segments T' and T², and exerting sufficient pressure securely to clamp the binding tape in place. As shown, the outer ends of the punch may be provided with a pair of knobs 130, which are adapted to register with recesses 131 in the clamping jaw 79. In this manner, concavo-convex portions may be stamped into the binding tape for militating against separation of the tape from the bag. The shuttle 71 is provided with grooves 132 to pass over the knobs 130. From the above description, it is also apparent that the knife blade 74 may reciprocate in the groove 91 formed in the end of the folding plunger 87. After the closures have been formed the clamping jaws 63 and 79 and associated parts return to normal position to permit the filled package to drop from the machine. The above described operation is then repeated after the mandrel has advanced another portion of the bag tube.

Figure 23:
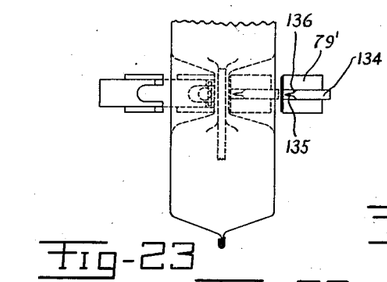
Figures 23 to 29 are diagrammatic views showing the operation of a modified form of closure-forming mechanism.
Figure 24:
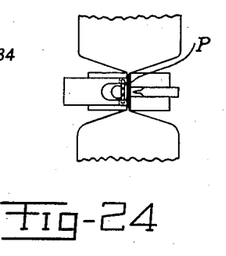
Figure 25:
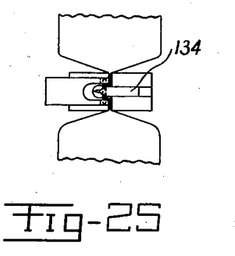
Figures 26, 27, 28, 29, 30, 31:
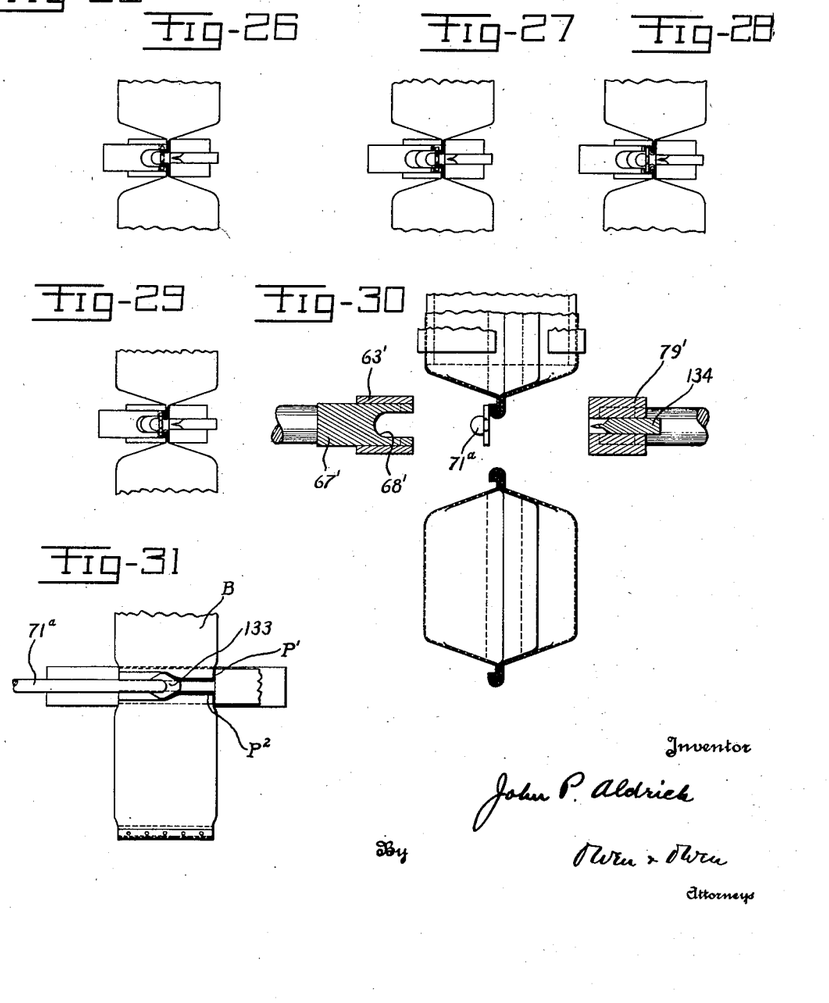
Figure 30 is a side elevation partly in section of the closure-forming mechanism shown diagrammatically in Figs. 23 to 29.
Figure 31 is a side elevation of the final tape folder shown in Fig. 30.

In the modified form of the invention shown in Figs. 23 et seq. the construction and operation of the mechanism is very similar to that hereinbefore described, except that the shuttle or slide 71ª, which is provided with a head 133 for completing the bending operation of the tape segments P¹ and P² progressively as it reciprocates across the bag tube, is not provided with a knife blade. Instead a cutting and folding plunger 134 is movable relatively to the clamping jaws 79', and is provided with a blade 135, on opposite sides of which are bending shoulders 136. As shown in Fig. 25, the plunger 134 is advanced, and the tape P is first severed longitudinally by the knife blade 135, the entire strip being cut at substantially the same time. Thereafter, the shoulders 136 engage the tape segments P¹ and P², and bend them and the adjacent walls of the bag tube at substantially right angles, as indicated in Fig. 26. After this operation the shuttle 71ª moves across the bag tube and progressively completes the bending operation, as indicated in Fig. 31. In this form the clamp 63' cooperates with the clamp 79', and a plunger 67' having a recessed head 68' presses the binding tape into secure clamping relation with the bag walls. Since the remaining operation of the form shown in these figures will be readily apparent from the description hereinbefore set forth, further detailed description thereof is not considered necessary.

While I have described my improved machine in more or less detail to comply with the requirements of the statute, it is, nevertheless, desired that this detailed description be considered merely as illustrative, and not as limiting, and it is to be understood that changes and modifications in details of construction, arrangement and operation, as well as choice of materials, may be made by those skilled in this art without departing from the invention as defined in the following claims.

I claim:

1. A packaging machine comprising means to apply a strip of bendable material across one side of a continuous bag tube, and means reciprocable longitudinally of the strip for severing same and the adjacent bag tube upon movement in one direction and to fold the severed sections in opposite directions about the bag tube segments upon movement in the opposite direction.

2. Mechanism for forming two closures in a bag tube, one providing the top for one bag and the other the bottom for another bag, comprising means to apply a metallic strip across one side of the tube, a member movable to and fro across the tube for longitudinally severing the metallic strip and bag tube when moved in one direction and bend the segments of the strip about the bag tube sections when moved in the opposite direction, and means to actuate said member.

3. Closure-forming mechanism for bag tubes comprising means to apply sheet metal to one side of a bag tube, and means reciprocable transversely of the bag tube for severing the sheet metal and bag tube in one direction and imparting folding movement to the sheet metal about the bag tube sections in the other direction.

4. Closure-forming mechanism for bag tubes comprising means to apply sheet metal across one side of a bag tube, and means reciprocable across the bag tube for successively severing the sheet metal and bag tube and then imparting folding movement to the sheet metal about the ends of the bag tube sections.

5. Closure-forming mechanism for bag tubes comprising means to apply sheet metal across one side of a bag tube, a plunger reciprocable across the bag tube, a knife carried by said plunger for severing the sheet metal and bag tube, and cam means carried by said plunger for bending the sheet metal about the severed bag tube sections.

6. In a machine of the class described, means for providing a continuous tube of flexible sheet material, means to feed tape across the tube, and a plunger reciprocable across the tube and adapted to sever the tape longitudinally upon movement in one direction and fold the tape segments about the ends of the bag tube sections upon movement in the opposite direction.

7. In a machine of the class described, a pair of members to clamp together opposite sides of a bag tube, members to feed tape between said clamping means on one side of the bag tube, a slide reciprocable along one of said members, a knife on said slide for severing the tape and bag tube, means operable after said knife has operated, for folding the tape segments in the same direction, and cam means on said slide for continuing the folding movement of the tape segments about the ends of the bag tube sections.

8. In a machine of the class described, means to advance a continuous bag tube of flexible sheet material, means operable at right angles to the movement of said advancing means to feed tape across the tube, means to clamp the tape to the tube, means for longitudinally severing the tape and the adjacent bag tube, means for folding the tape segments in the same direction, and means carried by and movable with said severing means for completing the folding of both tape segments concomitantly about the bag tube sections.

9. In a machine of the class described, means to advance a continuous bag tube of flexible sheet material, means operable at right angles to the movement of said advancing means to feed tape across the tube, means to clamp the tape to the tube, a slide reciprocable along the outer side of the tape when the latter is fed to the tube, a knife for severing the tape longitudinally and the bag tube upon movement of the slide in one direction, said slide having an opening substantially the width of the tube and adapted to register with the tube after said knife has completed its severing operation, means adapted to project into said opening for partially bending the tape segments in the same direction, and means operable upon movement of said slide in the opposite direction for completing the bending of the tape segments about the ends of the bag tube sections.

10. In a machine of the class described, means to provide an elongate bag tube of flexible sheet material, means to apply a strip of tape transversely of the bag tube, means to clamp the tape against the bag tube thereby collapsing the latter, a bar reciprocable on said clamping means and having a knife for progressively severing the tape longitudinally and the adjacent bag tube walls, said bar having an opening registrable with the bag tube after the severing operation, means projectable into said opening for initially bending the tape segments in the same direction, and means on said bar for completing the bending of the tape around the ends of the bag tube sections.

11. In a machine of the class described, means to provide an elongate bag tube of flexible sheet material, means to apply a strip of tape transversely of the bag tube, means to collapse the bag tube adjacent the tape, a knife adapted progressively to sever the tape longitudinally and the adjacent bag tube walls, means for outwardly bending portions of the tape segments, and means adapted progressively to engage the bent portions of the tape segments and bend same against the opposite sides of the bag tube sections thereby closing the ends thereof.

12. In a machine of the class described, means to provide an elongate bag tube of flexible sheet material, means to apply a strip of tape transversely of the bag tube, means to collapse the bag tube adjacent the tape, unitary means reciprocable transversely of the bag tube for severing the tape longitudinally and bag tube walls when moved in one direction and for completing the folding of the tape segments about the bag tube sections when moved in the opposite direction, and means operable after the severing operation but before the final tape-folding operation for initially folding the tape segments in opposite directions.

13. In a machine for closing bag tubes, tape applying means, and unitary means movable transversely of the bag tube in one direction for severing the tape and adjacent bag walls and in the opposite direction for folding the tape segments about the bag tube sections.

14. In a machine for closing bag tubes, tape applying means, and conjoint means movable transversely of and along one side of the bag tube in one direction for severing the tape longitudinally and adjacent bag walls, and in the opposite direction for folding the tape segments and adjacent bag walls about the ends of both bag tube sections.

15. In a bag making and filling machine, a mandrel for forming a continuous bag tube of flexible sheet material, means for feeding material through said mandrel into the bag tube, means for closing the lower end of the bag tube, means for recurrently reciprocating said mandrel thereby to advance the bag tube, and means for regulating the operation of said reciprocating means, said means being adjustable while the machine is in operation or idle thereby to increase or diminish the extent of feeding movement imparted to the bag tube.

16. In a bag making and filling machine, a bag tube former, means adjacent the lower end of said tube former for closing the end of the tube, means for recurrently imparting feeding movement to said tube former after the tube has been closed thereby to advance the tube, and means to vary the extent of movement of said feeding means.

17. In a bag making and filling machine, a reciprocatory bag tube former, means for guiding flexible sheet material to said former, means for recurrently imparting feeding movement to said former, and means engageable with the sheet material for causing the latter to move with the tube former when the latter moves in one direction but movable freely over the sheet material when the tube former moves in the opposite direction.

18. In a bag making and filling machine, a reciprocatory bag tube former, means for guiding flexible sheet material to said former, means for recurrently imparting feeding movement to said former, rollers movable with said mandrel and engageable with the sheet material carried thereby, and means preventing rotation of said rollers during advancing movement of said mandrel but permitting rotation thereof during retracting movement of said mandrel.

19. In a machine for closing bag tubes, means to apply tape across the bag tube, means reciprocable longitudinally of the tape for concomitantly severing the tape into segments and the bag tube into sections, and means for folding portions of the tape segments and adjacent bag tube walls upon themselves thereby to form two closures in the bag tube.

20. In a machine of the class described, a mandrel for a continuous bag tube, and means for recurrently reciprocating said mandrel, said means comprising an actuating member, a lever having lost motion connection with said member at one end, a pivotal mounting for the opposite end of said lever, link means to oscillate said lever, and manual means for varying the normal position of said link means for changing the stroke of said lever.

21. In a machine of the class described, a mandrel for a continuous bag tube, and means for recurrently reciprocating said mandrel, said means comprising an actuating member, a lever having lost motion connection with said member at one end, a pivotal mounting for the opposite end of said lever, link means to oscillate said lever, and means for moving said pivotal mounting and said link means for changing the stroke of said lever.

JOHN P. ALDRICH.